US008014604B2

(12) United States Patent
Tzadok et al.

(10) Patent No.: US 8,014,604 B2
(45) Date of Patent: Sep. 6, 2011

(54) OCR OF BOOKS BY WORD RECOGNITION

(75) Inventors: Asaf Tzadok, Nesher (IL); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 12/103,717

(22) Filed: Apr. 16, 2008

(65) Prior Publication Data

US 2009/0263019 A1  Oct. 22, 2009

(51) Int. Cl.
*G06K 9/34* (2006.01)
*G06K 9/68* (2006.01)
*G06K 7/10* (2006.01)

(52) U.S. Cl. .................. 382/177; 382/218; 382/321

(58) Field of Classification Search .................. 382/177, 382/218, 321
See application file for complete search history.

(56) References Cited

U.S. PATENT DOCUMENTS

| | | | | |
|---|---|---|---|---|
| 5,845,305 | A * | 12/1998 | Kujiraoka | 715/234 |
| 6,374,210 | B1 * | 4/2002 | Chu | 704/9 |
| 6,662,168 | B1 * | 12/2003 | Wallach et al. | 706/14 |
| 7,092,870 | B1 * | 8/2006 | Chen et al. | 704/9 |
| 7,236,632 | B2 * | 6/2007 | Erol et al. | 382/218 |
| 7,305,382 | B2 * | 12/2007 | Kobayashi | 707/709 |

OTHER PUBLICATIONS

Leung et al. "IOCR: Intelligent Optical Character Reader" IEEE, 1989, pp. 70-73.*

* cited by examiner

*Primary Examiner* — Jingge Wu
*Assistant Examiner* — Utpal Shah

(57) ABSTRACT

Disclosed embodiments of the invention provide automated global optimization methods and systems of OCR, tailored to each document being digitized. A document-specific database is created from an OCR scan of a document of interest, which contains an exhaustive listing of words in the document. Images of each word, taken from all the fonts encountered, are entered into the database and mapped to a corresponding textual representation. After entry of a first instance of an image of a word written in a particular font, each new occurrence of the word in that font can be quickly recognized by image processing techniques. The disclosed methods and systems may be used in conjunction with adaptive character recognition training and word recognition training of the OCR engines.

20 Claims, 9 Drawing Sheets

OCR OF BOOKS BY WORD RECOGNITION

BACKGROUND OF THE INVENTION

1. Field of the Invention

This invention relates to optical character recognition. More particularly, this invention relates to adaptive optical character recognition for books and other documents written in multiple fonts and languages.

2. Description of the Related Art

Optical Character Recognition (OCR) has become a widely used tool in modern document processing. Typical commercial OCR engines are designed for the recognition of a wide variety of text images ranging from letters and business forms to scientific papers. Large digitization projects typically include digitization of library collections and are carried out at archive centers. These organizations scan books, newspapers and other documents, subject them to OCR, and create an electronic representation of the content. Hence, the importance of OCR quality is growing. Unfortunately, libraries and archive centers must either tolerate low quality data or make large investments in manually correcting OCR results.

SUMMARY

An embodiment of the invention provides a computer-implemented method of image-to-text processing, which is carried out by acquiring an image of a document, segmenting the image into areas, each area containing one word, and for each of the areas, defining a dictionary containing reference images of the words as sequences of characters in respective fonts. Each reference image is associated with a respective code. The method is further carried out by comparing the areas to the reference images, classifying the words in the document that match the reference images as identified words and classifying the words that do not match any of the reference images as unidentified words. The method is further carried out by generating respective new codes for one or more of the unidentified words, adding the one or more unidentified words and the respective new codes to the dictionary for use in comparing other areas of the document, and outputting a coded version of the document.

Other embodiments of the invention provide computer software product and apparatus for carrying out the above-described method.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

Figure 1:
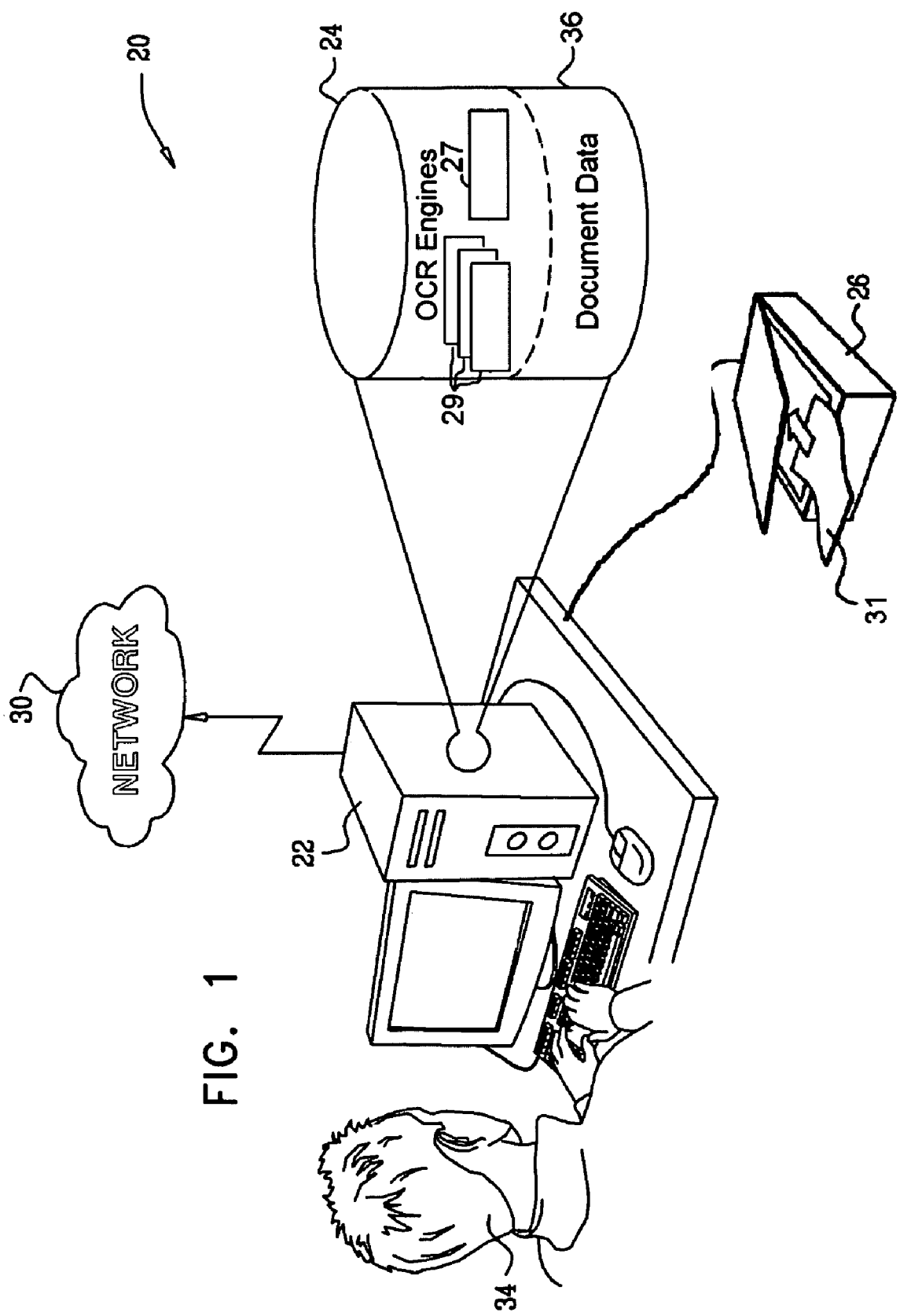
FIG. 1 is a schematic illustration of an image-to-text processing system, which is constructed and operative in accordance with a disclosed embodiment of the invention.

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Overview.

Disclosed embodiments of the invention provide automated global optimization methods and systems of OCR, tailored to each document being digitized. A document-specific database is created, typically from an OCR scan of a document of interest, which contains an exhaustive listing of the document. Images of each word, taken respectively from all fonts in which it is encountered, are entered into the database and mapped to a corresponding encoding or textual representation of the word. After entry of a first instance of an image of a word written in a particular font, each new occurrence of the word in that font can be matched to the encoded representation or textual representation by image processing techniques employed by an OCR engine. Using the disclosed methods and systems, optionally in conjunction with adaptive character recognition training and word recognition training of the OCR engine, it is possible to achieve high quality digital data without a massive investment in data correction that would be unavoidable otherwise.

In one aspect of the invention, a document or book having about 100.000 words, might be represented in the document-specific database by 4,000-5,000 entries. In another aspect of the invention, it is feasible by appropriate encoding practice, to translate a document into a different language. Indeed, application of the inventive principles enables translation of a document into a different language having a different writing system. For example, a coded output of a document written in a Latin or Cyrillic alphabet might appear as an Asian language, such as Chinese. It is only necessary to assign an appropriate symbol or meaningful code to entries in the document-specific database, and to display an appropriate visual representation of that code as system output.

System Architecture.

Disclosed embodiments of the invention provide automated global optimization methods and systems of OCR, tailored to each document being digitized. The techniques are particularly useful for large documents such as books.

Turning now to the drawings, reference is initially made to FIG. 1, which is a schematic illustration of an image-to-text processing system 20, which is constructed and operative in accordance with a disclosed embodiment of the invention. The term OCR as used herein includes (1) recognition of individual characters or symbols, termed "character recognition", and (2) recognition of strings of characters as words known to the system, termed "word recognition". According to an aspect of the invention, both recognition functions are employed in adaptive image-to-text processing. Processes of improving the system's performance of these two recognition functions are referred to respectively as "character recognition training" and "word recognition training", respectively.

The system 20 comprises a processor 22 and a memory 24 holding data objects and programs. The processor 22 is programmed with suitable software for carrying out the functions described hereinbelow.

Although the memory 24 is shown in FIG. 1 as a single local data store of the computer, it may be distributed to include sites remote from the computer, for example, on a server or shared disk system (not shown), and accessed by the processor 22 via a data network 30. The memory 24 stores an object that implements a generic OCR engine 27. Many commercial omni-font OCR engines are suitable for use as the OCR engine 27. The memory 24 also holds a battery of OCR engines 29 that are specialized for particular fonts. The processor 22 is programmed to access and execute the OCR engine 27 and the OCR engines 29, accepting information from an input device, such as an optical scanner 26, which is adapted to scan document 31, or from image files representing a document of interest. The OCR engine 27 and the OCR engines 29 may comprise a suite of programs that have been specialized for the functions described herein. The OCR engine 27 and the OCR engines 29 operate mostly automatically, but occasional assistance by an operator 34 may be required. Output of the OCR engine 27 and the OCR engines 29 may be stored as document data 36. In particular the document data 36 includes a document-specific word image database, including an encoded representation of the document words. The document data 36 may additionally or alternatively comprise textual data representing a coded version of the document for output. Software suitable for searching an image database may be incorporated in the OCR engine 27, or implemented as a separate module (not shown).

In some environments the processor 22 may be linked to other processors (not shown) and may accept image data from remote image devices or image databases (not shown) via the network 30. However, this is not essential, and the system 20 may be realized as a stand-alone device.

Operation.

Figure 2:
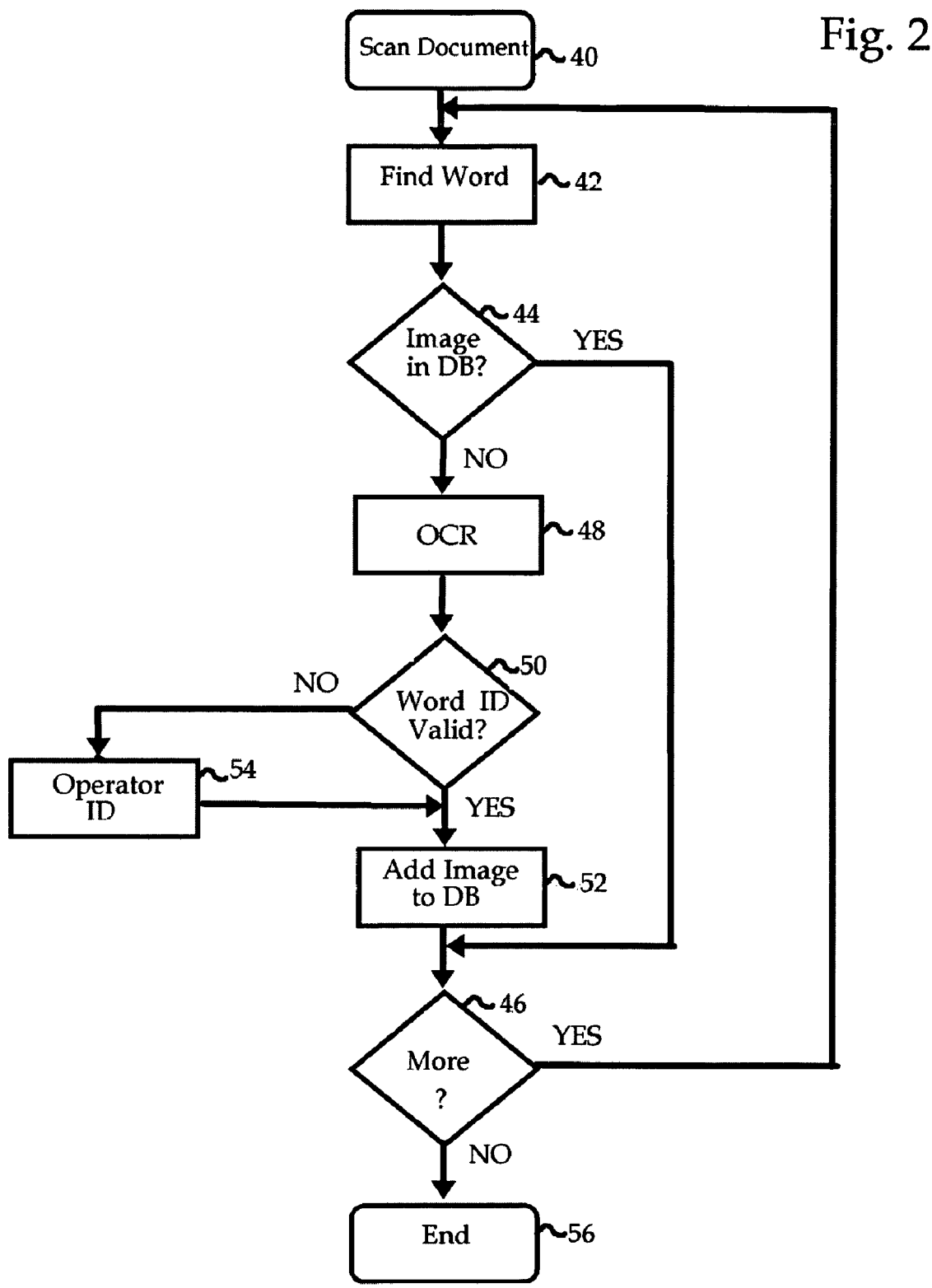
FIG. 2 is a high level flow chart of a method for image-to-text processing in accordance with a disclosed embodiment of the invention.

Reference is now made to FIG. 2, which is a high level flow chart of a method for image-to-text processing in accordance with a disclosed embodiment of the invention. The order of the process steps may vary in different embodiments from those shown in FIG. 2. As noted above, the method involves creation of a document-specific database, in which images of words of the document are mapped to encoded or textual representations of the words.

At initial step 40 a document, such as a book or manuscript, is scanned using any suitable scanning device, or received from an image file or database. Conventional pre-processing is applied, e.g., image enhancement, noise elimination and de-skewing, to produce raw image data.

Next, at step 42, a word-by-word traversal of the image data begins. Word recognition may be done by evaluation of inter-symbol spacing. For example regional statistical separation distributions of symbols may be obtained throughout the document, and inter-symbol separations falling in a statistically determined range may designate word boundaries.

Once a word has been found in step 42, control proceeds to decision step 44, where it is determined if the image of the current word already exists as an entry in the document-specific database. Decision step 44 involves a search of the document-specific database to find a match between the image of the current word and an image previously entered. In order conduct the search efficiently, one can apply known search strategies, pruning techniques and heuristics. For example, the search may initially focus on characters that are identifiable with a high confidence level, or on word size, or the presence of subscripted or superscripted characters. It is also possible to relate the search to the presence of neighboring words and to apply domain-specific knowledge. For example, the word "president" in a document dealing with World War II may increase the likelihood that the word "Roosevelt" follows.

Additionally or alternatively, the match may be found using pattern matching or pixel-based techniques. For example, assuming that the document contains the words "Character" and "character", the two versions might appear as separate image entries in the document-specific database, both linked to an encoded representation for the word character. Hence, in principle, simple pixel correlation can be applied. However, given possible variations in printing and scanning quality, the search would allow for cases in which portions of the characters are not defined, or are even invisible. One way to achieve this effect is to count all the pixels that are black on both images being compared. Then pixels located in the vicinity of "common black areas" are discarded in order to take into account variation in character width due to the scanning process. Finally, remaining black pixels can be counted in order to estimate the significant differences between the two images.

If the search finds a match between two word images, then in order to guarantee a required level of accuracy, optional operator-assisted confirmation may be obtained. In applications where a higher error level can be tolerated, the performance of decision step 44 may be entirely automated.

If the determination at decision step 44 is affirmative, there is no need to further consider the current word. It is simply reported or outputted as a recurrence of a known word in the current document. Control then proceeds directly to decision step 46, which is explained below.

If the determination at decision step 44 is negative, then control proceeds to step 48. The current word is subjected to a generic OCR engine, e.g., the OCR engine 27 (FIG. 1). The words that are evaluated by the OCR engine may include characters and icons. The term icon herein comprises visual representations of information other than alphabetic or alphanumeric characters and words, e.g., logos, mathematical symbols. Step 48 typically includes the use of a spell-checking program once a textual representation has been developed by the OCR engine.

Control now proceeds to decision step 50, where it is determined if the OCR procedure of step 48 resulted in a valid identification of the current word, according to some predetermined criterion. The criterion can be application dependent.

If the determination at decision step 50 is affirmative, then control proceeds to step 52. The document-specific database is now updated. If the current word has been encountered for the first time, step 52 may involve creation of a new encoded or textual representation for the current word. Otherwise, the image of the current word is added to a list of images that map or correspond to the existing encoded or textual representation of the current word. The latter situation commonly arises when the current word is recurrent in the document, but occurs in different fonts or languages, in the case of multi-lingual documents.

If the determination at decision step 50 is affirmative, then control proceeds to step 54. A human operator identifies the current word. Control then continues at step 52, which has been described above.

Control now proceeds to decision step 46, where it is determined if more words in the current document remain to be evaluated. If the determination at decision step 46 is affirmative, then control returns to step 42.

If the determination at decision step 46 is negative, then the procedure terminates at final step 56.

Figure 3:
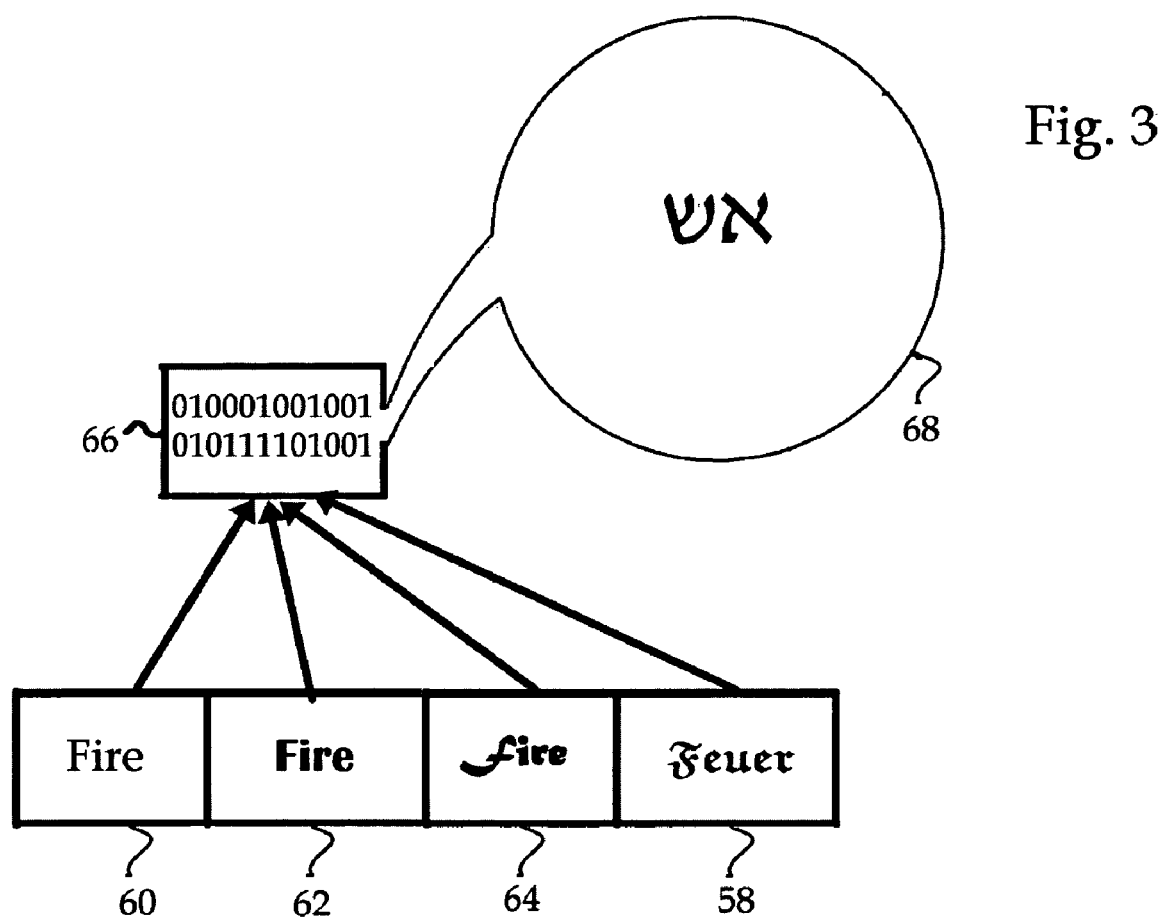
FIG. 3 illustrates a representative set of entries in a document-specific database taken from a multi-lingual document.

Reference is now made to FIG. 3, which illustrates a representative set of entries in a document-specific database taken from a multi-lingual document. The database includes representative entries for several occurrences of the word "fire", written in different font styles. Image 58 was acquired from a portion of the document written in German. Images 58, 60, 62, 64 all map to an encoded version of the word fire, shown in block 66, which in turn is a representation of the Hebrew word for fire, indicated by balloon 68. The document-specific database is thus useful for effecting a translation between English, German, and Hebrew.

ALTERNATE EMBODIMENT 1

Figure 4:
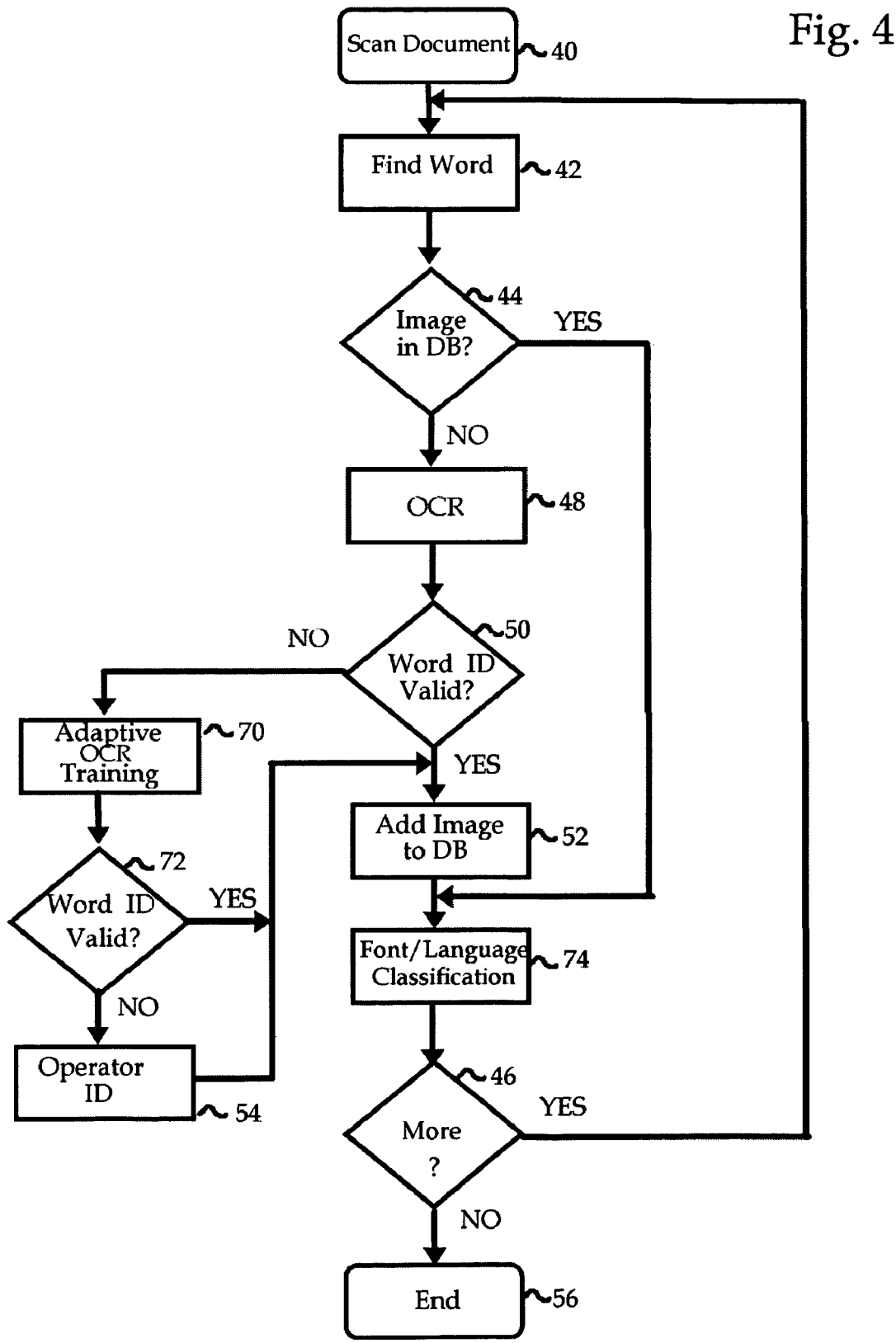
FIG. 4 is a high level flow chart of a method for image-to-text processing in accordance with an alternate embodiment of the invention.

Reference is now made to FIG. 4, which is a high level flow chart of a method for image-to-text processing in accordance with an alternate embodiment of the invention. Many of the process steps in FIG. 4 are identical to those of FIG. 2. The details are not repeated in the interest of brevity. This embodiment employs adaptive character recognition training and word recognition training to increase the accuracy of word identification, and to reduce the need for operator assistance.

If decision step 50 has resulted in a determination that the identification of the current word by conventional OCR is invalid, control proceeds to step 70. The current word is marked for adaptive word recognition training. At the conclusion of the adaptive word recognition training, the current word is rescanned, as described in step 48.

Control now proceeds to decision step 72, where it is determined if word recognition training and rescanning have resulted in a valid identification of the current word. If the determination at decision step 72 is affirmative, then control proceeds to step 52, which has been described above.

If the determination at decision step 72 is negative, then control proceeds to step 54 for operator-assisted identification, as described above.

Adaptive word recognition training can be conducted efficiently if the current document is classified by language and font. This is performed in step 74. Details of step 74 are described in further detail below. The process then continues in decision step 46, which has already been described.

Adaptive Word Recognition.

Figure 5:
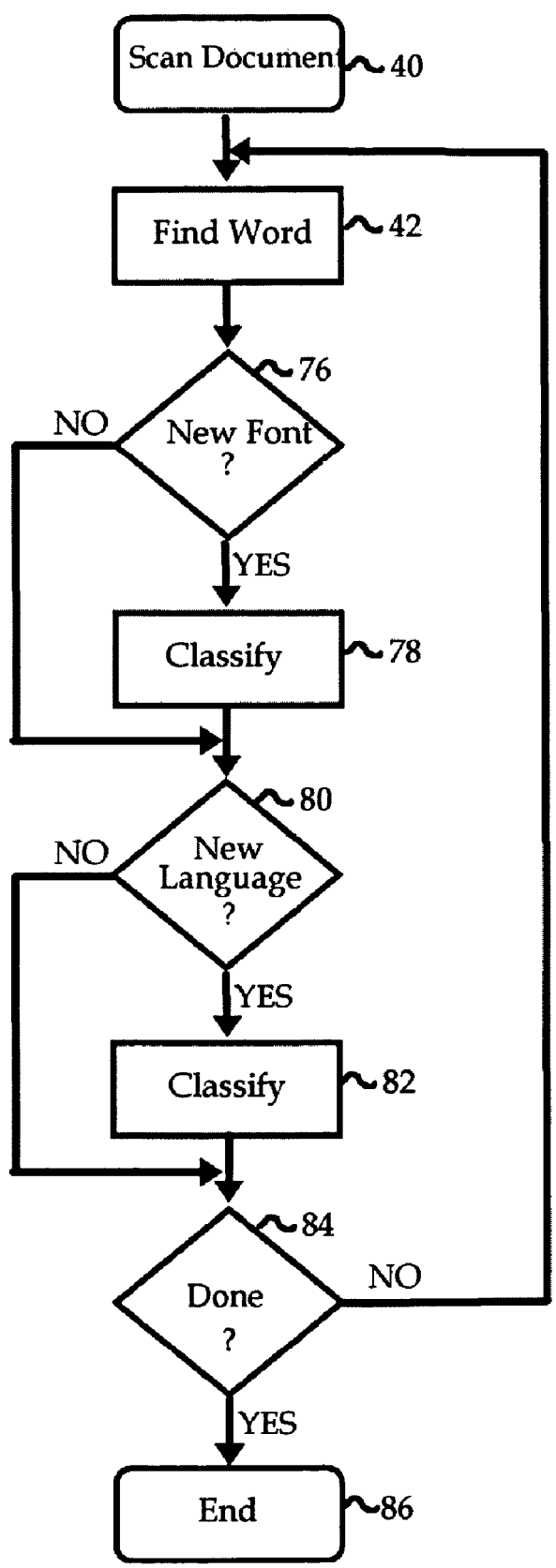
FIG. 5 is a flow chart of a phase of a process for globally optimizing image-to-text processing in accordance with a disclosed embodiment of the invention.

Continuing to refer to FIG. 4, step 70, which involves adaptive word recognition training of the OCR engine, is now described. In this embodiment, adaptive word recognition training is facilitated by segmenting the current document according to fonts and languages, as noted in step 74. Reference is now made to FIG. 5, which is a flow chart of a first phase of a process for adaptive image-to-text processing in accordance with a disclosed embodiment of the invention. The process begins at initial step 40. It is assumed that scanning, and preliminary OCR of a current word has been performed, as described in the discussion of FIG. 2. The process steps are shown in a particular linear sequence in FIG. 5 for clarity of presentation. However, it will be evident that many of them can be performed in parallel, asynchronously, or in different orders.

During traversal of the document a new word is found in step 42, as discussed above with reference to FIG. 2 and FIG. 4. In some embodiments, however, the traversal need not be performed concurrently with word identification as shown in FIG. 2 and FIG. 4. For example, the entire document might be scanned preliminarily, and a traversal of could occur in any suitable order, or using multiple OCR engines concurrently.

Control now proceeds to decision step 76, where it is determined if a new font has been identified. This determination in the first iteration of decision step 76 is normally affirmative.

If the determination at decision step 76 is affirmative, then control proceeds to step 78. The extent of the area in the document written in the previous font is delineated to complete its classification entry, e.g., by page and line number, paragraph number, or using any suitable spatial units. A classification entry for the new font is initiated. Upon completion of iterations of step 78, all areas of the document covered by the various fonts in the current language will have been recorded in respective classification entries.

If the determination at decision step 76 is negative, or after completing step 78, control proceeds to decision step 80, where it is determined if a new language has been identified. If the determination at decision step 80 is affirmative, then control proceeds to step 82. The extent of the area of the old language is delineated to complete its classification entry. A classification entry for the new language is initiated. Following iterations of decision step 80 all areas of the document covered by the various languages will be recorded in respective classification entries.

If the determination at decision step 80 is negative or after completing step 82, control proceeds to decision step 84, where it is determined if the traversal of the document has been completed.

If the determination at decision step 84 is negative, then control returns to step 42, where the traversal continues.

If the determination at decision step 84 is affirmative, then the procedure terminates at final step 86. At this point, a full analysis of the document by font and language is available in the classification entries.

Figure 6:
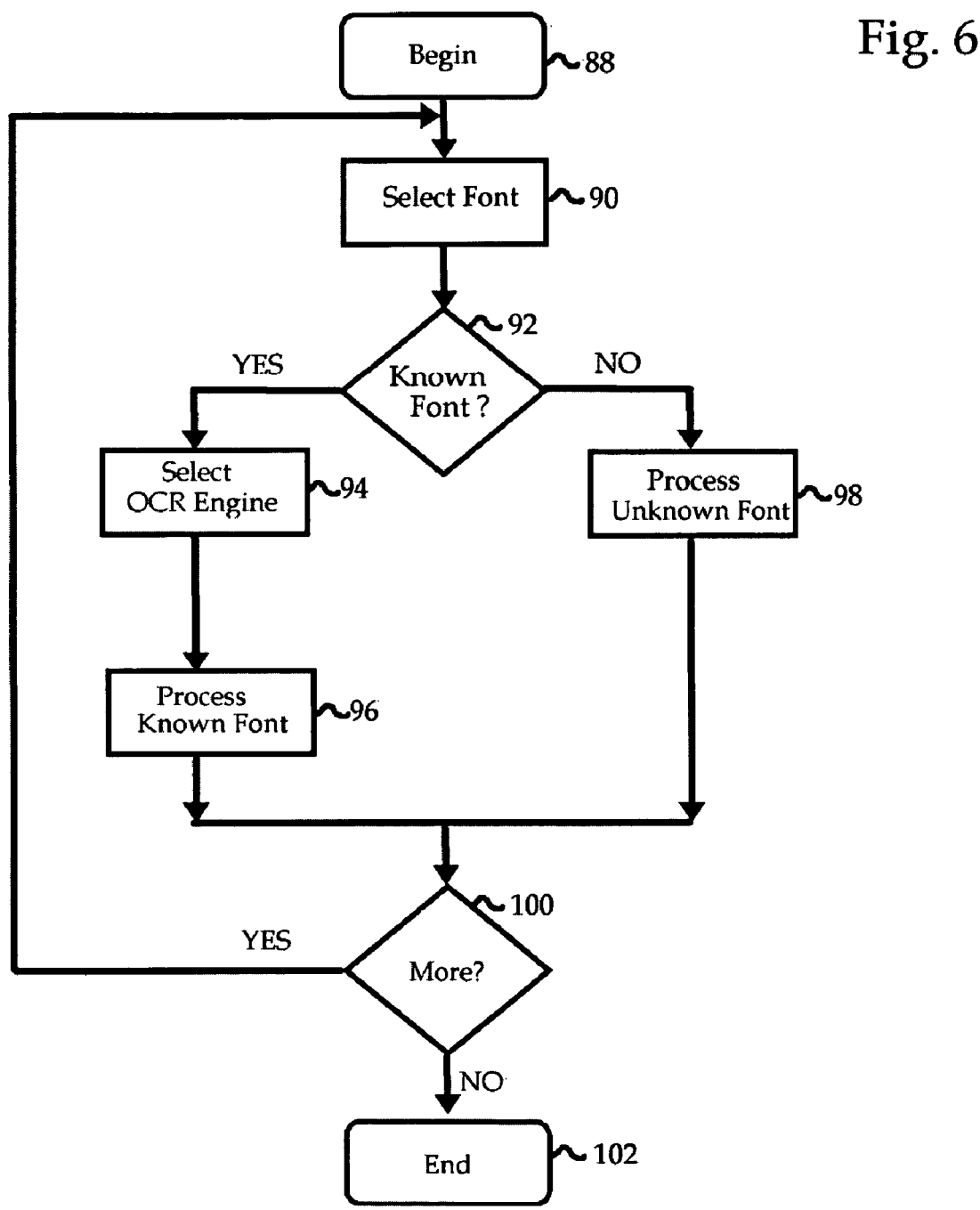
FIG. 6, which is a high level flow chart of a method of image-to-text processing in accordance with a disclosed embodiment of the invention.

Reference is now made to FIG. 6, which is a high level flow chart of a method of image-to-text processing in accordance with a disclosed embodiment of the invention. In initial step 88, it is assumed that the method described with reference to FIG. 5 has been carried out and a classification of the document by font and language is available. Evaluation of the font classification begins. The languages of the document are immaterial at this stage. For example, a font such as Fractur would be treated identically in portions of the document written in German and Latvian. The goals of this phase of the document analysis are to classify the fonts either as recognized (known) to the system, or unrecognized (unknown), and to further identify or characterize the known fonts.

At step 90 a font is chosen from the document font classification entries.

Control now proceeds to decision step 92, where it is determined if the current font is known to the system. If the determination at decision step 92 is affirmative, then control proceeds to step 94 where an appropriate OCR engine is selected from a battery of available OCR engines, e.g., OCR engines 29 (FIG. 1). Typically, the selected OCR engine is specialized for the current font. Then, at step 96, those portions of the document written in the current font are processed as a known font.

If the determination at decision step 92 is negative, then control proceeds to step 98, where processing of unknown fonts is conducted. Details of steps 94, 96 and step 98 are presented below.

After performing either of step 98 or steps 94, 96 control proceeds to decision step 100, where it is determined if more fonts remain to be evaluated. If the determination at decision step 100 is affirmative, then control returns to step 90.

If the determination at decision step 100 is negative, then the procedure terminates at final step 102.

Known Fonts.

Figure 7:
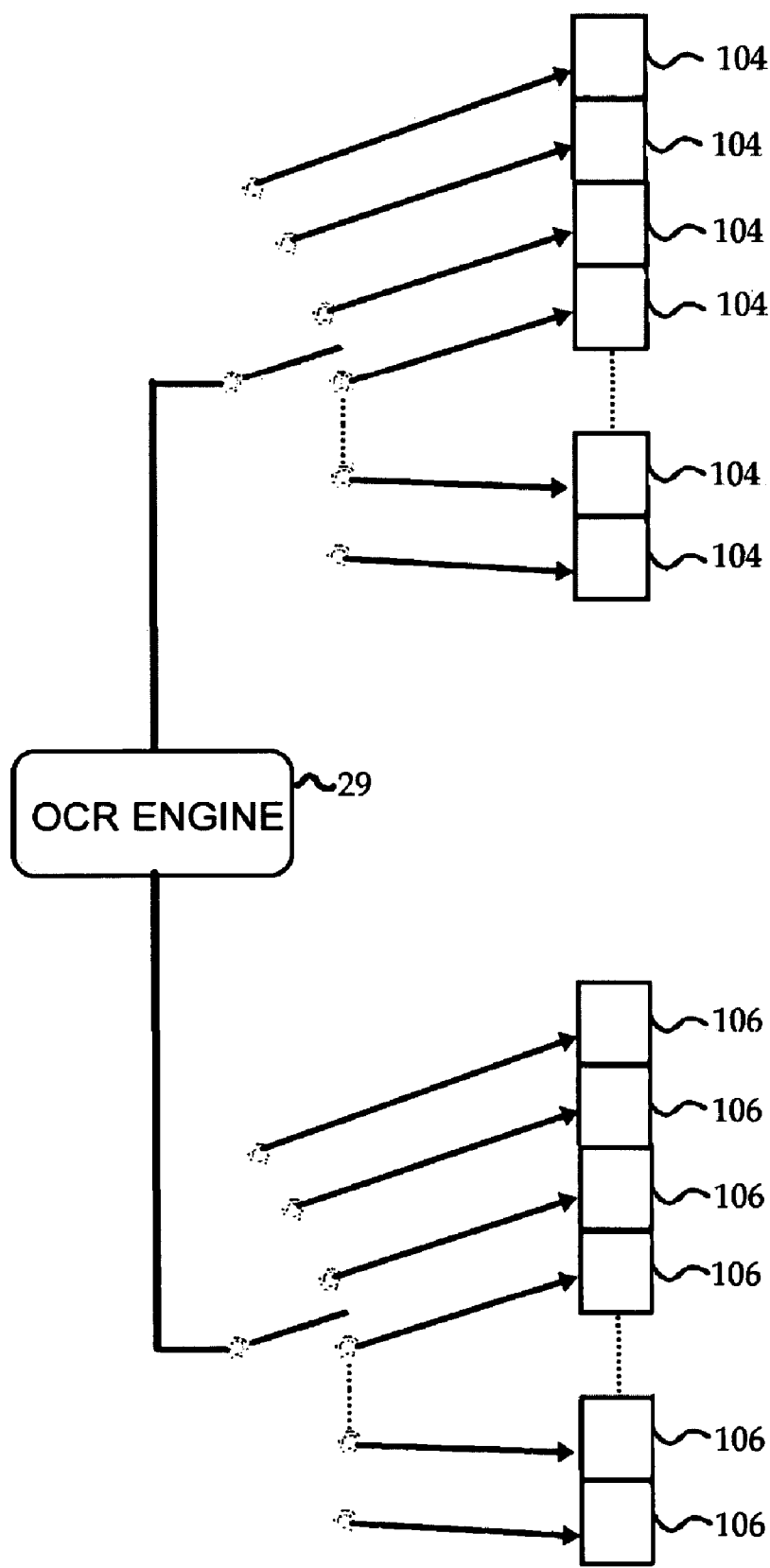
FIG. 7 is a block diagram of an aspect of an OCR engine in the system shown in FIG. 1.

In one aspect of the invention, each OCR engine has access to multiple word-oriented resources. Reference is now made to FIG. 7, which is a block diagram of portion of the system 20 (FIG. 1). The OCR engines 29 are typically specialized for processing particular fonts. Each has access to a battery of general language dictionaries 104 and a battery of domain-specific dictionaries 106. Domain-specific dictionaries are specialized dictionaries, which contain words and terminology relating to a specialized topic, and which are typically lacking in dictionaries that are more general. The term is relative, as dictionaries may be more or less domain-specific. For example, a domain-specific dictionary may be restricted to narrow areas of scientific specialization, e.g., astronomy, or may be broader and encompass general scientific terminology in the broader field of physics. In practice, such domain-specific dictionaries are chosen according to the nature of the document being processed in order to maximize the likelihood of word recognition. The language dictionaries 104 and domain-specific dictionaries 106 are all trainable. They may be stored and updated in the memory 24 (FIG. 1) or accessed remotely using the network 30 in many combinations.

Figure 8:
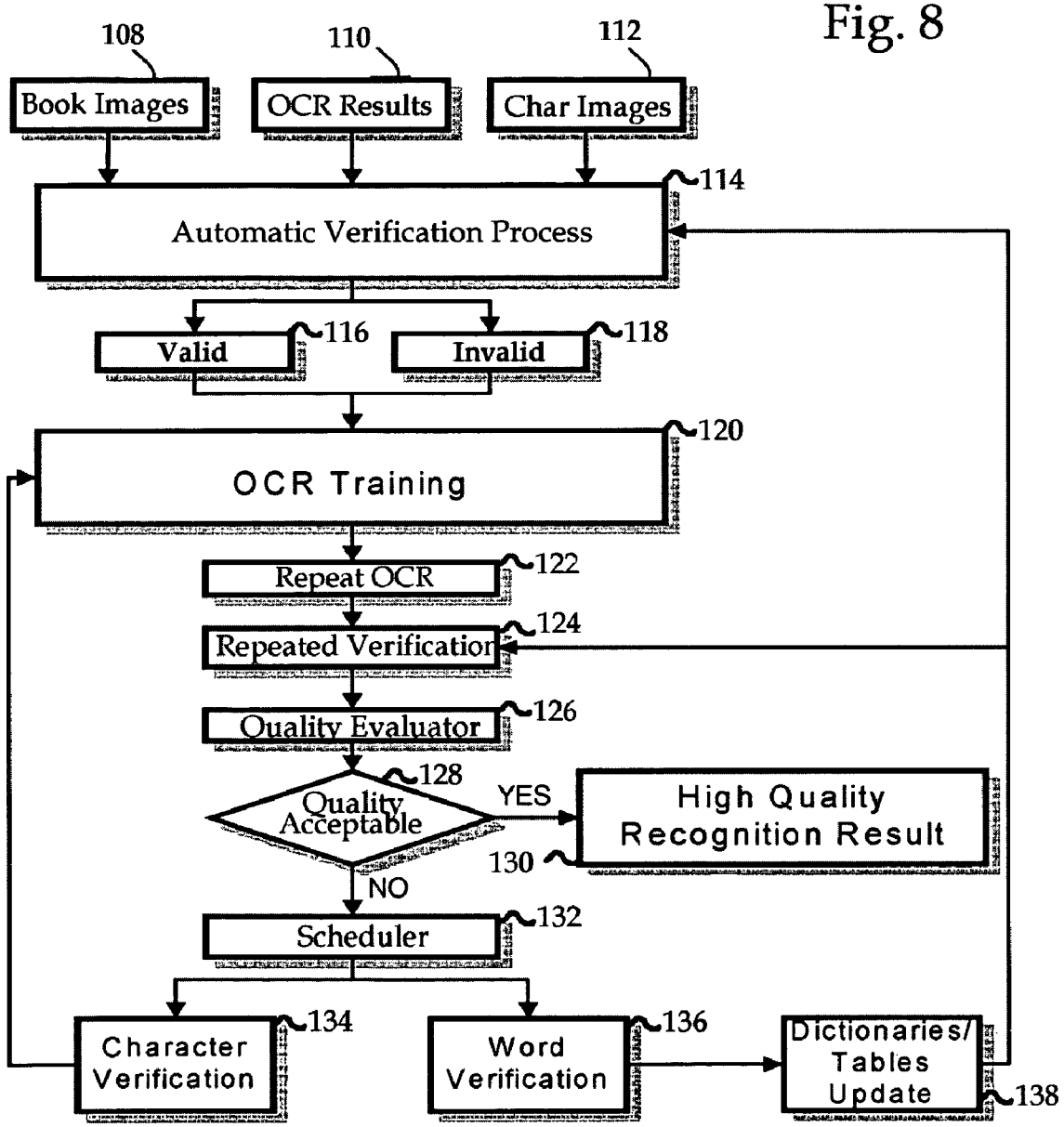
FIG. 8 is a flow chart of a method of processing of known fonts in a document according to a disclosed embodiment of the invention.

Reference is now made to FIG. 8, which is a flow chart illustrating processing of known fonts in a document according to a disclosed embodiment of the invention. FIG. 8 presents details of step 96 (FIG. 6). Several types of training are involved, including character recognition training and word recognition training. The different training activities are not necessarily coordinated with one another during successive iterations of the method. For example in character recognition training, character templates used by the OCR engines may be fully optimized while word recognition training is still ongoing. Similarly, word-recognition training of general language dictionaries or domain-specific dictionaries may occur independently of character recognition training. Typically, character recognition training and word recognition training are performed concurrently, for example using multiple threads. However, they may be performed sequentially, so long as the combined results are applied to the document currently being subjected to image-to-text operations.

The method begins by inputting textual data in one of several possible formats. The method of FIG. 8 typically follows performance of font classification as described above with respect to FIG. 6. However, in some cases a document may be known to be written using a single font and language. In this case, the classification phases described above may be omitted, and images of the entire document may be used in initial step 108. Usually, at least the pre-processing operations described in initial step 40 (FIG. 5) are first performed. Otherwise, pre-classified recognition results, typically but not necessarily prepared using the method described with respect to FIG. 5, are submitted in initial step 110. Alternatively, character images may be submitted in order to focus training on character recognition in initial step 112.

At step 114 the OCR results provided in initial step 108, 110, 112 are subjected to automatic verification, using conventional methods. An OCR engine has generally been specified, e.g., in step 94 (FIG. 5). Appropriate domain-specific and language-specific dictionaries are chosen, as shown in FIG. 7. Such techniques may be directed to recognition of individual characters. Additionally or alternatively, these techniques may be directed to character recognition or word recognition. In addition to the use of dictionaries, they may involve the application of statistical tables, such as probabilities of occurrences of different character strings, as computed for the entire document. They may involve searches for relatives of tentatively identified words in a language or domain-specific dictionary. An identification may be established when the search has identified the exact word in the dictionary. Alternatively, known fuzzy search techniques may be applied to the dictionaries to establish a tentative identification by locating a related word having a relevance exceeding some predetermined level, which is application dependent. The tentative identification may be confirmed if the fuzzy search determines that no other likely candidate exists.

In step 116 a confidence level for the currently identified subject, either a word or a character is measured. Exceeding an application-dependent confidence level categorizes the subject as "valid". If the subject cannot be identified, or is identified with a confidence level less than the threshold, the identification is classified as "invalid" in step 118.

Next, control proceeds to a generic training step 120, which varies according to the strategy being employed by the currently selected OCR engine. For example, in the case of automatic character recognition techniques, a current valid character may be included in a set of valid characters that is being used by the currently selected OCR engine. In the case of OCR engines employing word recognition techniques, a word classified as valid in step 116 determines some correct characters, which may then be assigned as references in the evaluation of subsequent words and characters.

Indeed, even subjects given an invalid classification in step 118 can be used in order to train the OCR engines. For instance, if an OCR engine employs a template matching approach, valid character images can be used in order to learn appropriate character templates valid to the specific book in question. Images classified as invalid may be used to increase the probability that a candidate can be excluded when attempting to identify a current subject.

After completing step 120, at step 122, the now trained OCR engine is used to reevaluate the image data that produced the OCR results in initial steps 108, 110, 112. Thus, in cases where the methods described in FIG. 1 and FIG. 5 were used to obtain the OCR results, it is necessary to have recourse to the appropriate classification information and to resubmit areas of the source document having particular known fonts to the currently selected OCR engine. In cases where language and font classifications are unnecessary, resubmission of the entire document image data to the currently selected OCR engine may suffice.

Next, at step 124 the data obtained in step 122 are subjected to re-verification, which produces revised recognition results. Step 124 is performed by iterating steps 114, 116, 118 with the new data.

At this point, the results of step 124 are presented to a quality evaluator in step 126. Step 126 may be performed automatically, or may be operator-assisted. It may vary according to the application and the degree of confidence required. Statistical techniques may be applied in step 126. The average number of subjects classified as invalid per 100 words, the distribution of subjects classified as invalid throughout the document, and the average confidence level of subjects classified as valid may be employed by quality evaluator in step 126 in various combinations.

Control now proceeds to decision step 128, where it is determined if current quality standards are met or exceeded according to the evaluation carried out in step 126. Output results encompassing the entire document may be evaluated. However, in some cases only a portion of the document is evaluated, in which case approval may be piecemeal. In any case, if the determination at decision step 128 is affirmative, then control proceeds to final step 130. A recognition report indicating high quality is issued, and the procedure terminates. When the document has been classified, the procedure may be iterated using other sections as input, beginning at initial steps 108, 110, 112.

If the determination at decision step 128 is negative, then control proceeds to adaptive scheduling step 132. It has been found that iteration and retraining improves the quality of the OCR results. In step 132 a retraining assignment schedule is established in accordance with the deficiencies of the current OCR results. In some cases, automatic retraining may be desirable. Additionally or alternatively, human operators may be required to be job-scheduled to assist in OCR retraining. For example, if the OCR quality falls below a minimum threshold, interactive retraining using human operators may be more effective than artificial intelligence approaches.

Assume that the text contains many low confidence characters "a". In step 132 it might be concluded that the OCR engine's template for the character "a" must be adjusted, a process that requires a large number of "a" samples. In order to obtain such samples, the system would automatically extract from the text under evaluation a large number of character images likely to be the letter "a". These images may be sent for manual verification, thereby creating high quality data to be used for OCR retraining purposes. Alternatively, it may be decided to automatically refine the "a" template.

One suitable technique for performing adaptive scheduling in step 132 is disclosed in the document *A Semiautomatic Adaptive OCR for Digital Libraries*, Sachin Rawat, et al. (2007), which is herein incorporated by reference.

If character verification requires further improvement, then at step 134 the results of the last performance of step 124 are assembled as appropriate. Control returns to step 120, where OCR retraining occurs, using the results assembled in step 134 as input.

Additionally or alternatively, if word verification requires improvement, at step 136, a word collection taken from the results of the last performance of step 124 is assembled. Word verification, beginning with step 136 may be carried out concurrently with character verification, beginning at step 134. For example, the two may be implemented as separate threads. Invalid words are authenticated, using human operators.

At step 138, word tables and verification dictionaries used by the OCR engine are revised, using the data obtained in step 136. Typically, at least a portion of the words categorized as invalid can be identified or authenticated. These are added to the verification dictionaries to establish revised verification dictionaries.

As an example of adaptation of the verification dictionaries, consider a historic book dealing with the first World War. Names of contemporary politicians are likely to be excluded from modern general purpose dictionaries. However, using a domain-specific dictionary, they can be identified as strings reoccurring in the text. If not identified, such names can still be added to the appropriate domain-specific verification dictionaries.

Of course, such reoccurring strings can be also caused by OCR errors. Accordingly, it is desirable to supplement the automatic aspects of step 138 by manual word verification. A human operator can quickly determine whether a problematic string should be added to the domain-specific dictionary or discarded.

Upon completion of step 138, control returns to step 114, to iterate automatic verification using the original image data taken from one of initial steps 108, 110, 112. Alternatively, control may return to step 120. Here repeat verification may be performed using the results of the last rescan in step 122. Unknown Fonts and Symbols.

The method described above with respect to FIG. 8 is feasible only if (1) a known font was recognized in decision step 92 (FIG. 6), and (2) the automatic verification process of step 114 (FIG. 8) has yielded a sufficient level of classifications as valid in step 116, the level being application dependent to some extent. Otherwise, it would be futile to perform and iterate the method of FIG. 8, as the results would not improve in a reasonable time. For example, consider a book containing unknown symbols, e.g., company logos. It is unlikely that any standard OCR engine would succeed in identifying such symbols. A modified approach for unknown fonts and unrecognizable symbols is necessary.

Figure 9:
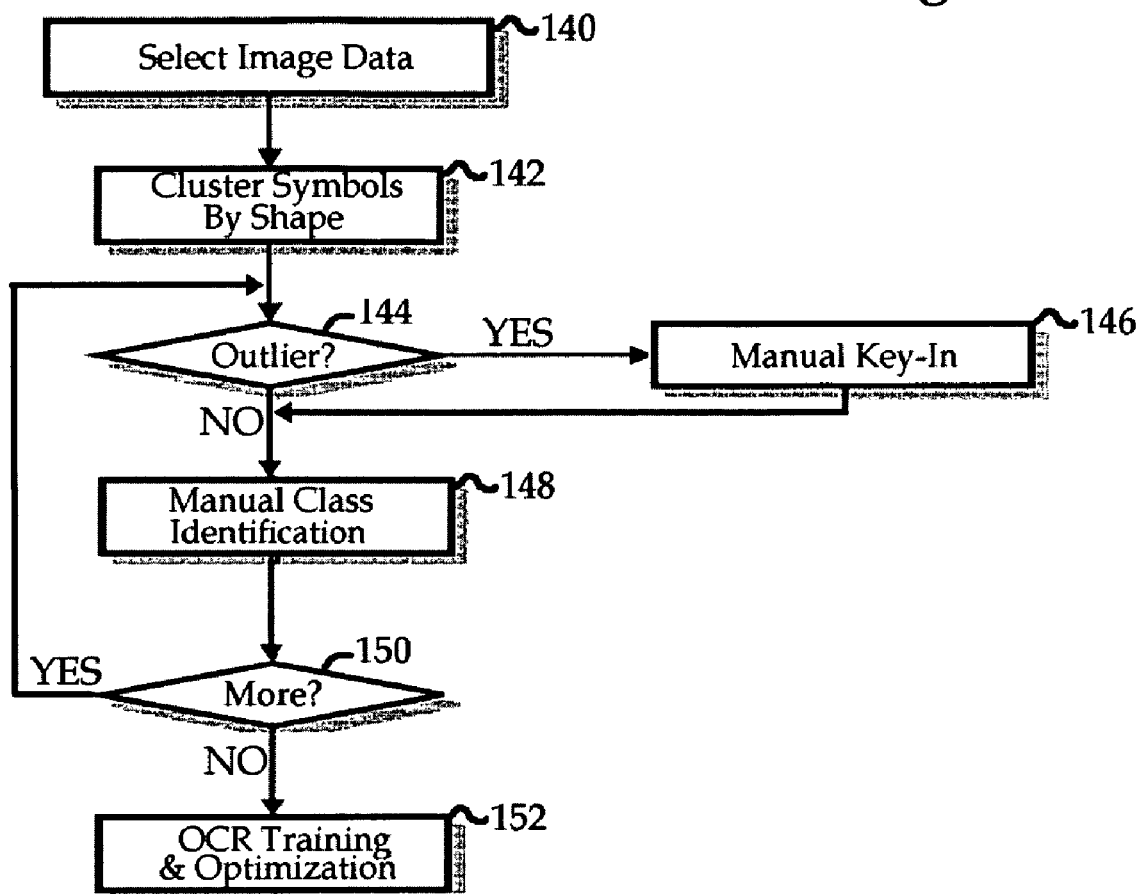
FIG. 9 is a flow chart of a method of processing system-unrecognized fonts and symbols in accordance with a disclosed embodiment of the invention.

Reference is now made to FIG. 9, which is a flow chart of a method of processing unknown fonts and symbols in accordance with a disclosed embodiment of the invention. The strategy is to segment a text image in order to identify individual symbols. An assumption is made that each connected component in a region or segment represents a meaningful symbol. The symbols thus identified are clustered according to shape. Each cluster is presumed to contain different samples of the same symbol. Final classification of the symbol is then accomplished interactively by an operator, and registered with the OCR engine, which becomes progressively trained. Thereafter, the method shown in FIG. 8 may be iteratively performed as described above.

At initial step 140 the font classification of step 78 (FIG. 5) may be exploited. At least a portion of the document image classified as having an unknown font is selected. Like the method of FIG. 8, the languages of the document are immaterial at this stage. The selection in initial step 140 is made from image data. The method of FIG. 9 may then be repeated using different portions of the document until all unknown fonts and symbols have been processed.

Next, at step 142 symbols of the selected text are clustered by shape using known methods. All members of a cluster are presumed to be representatives of the same symbol. However, some individuals may not clearly belong to any cluster and become candidates for classification as "outliers".

Control now proceeds to decision step 144, where it is determined if a selected symbol is an outlier. If the determination at decision step 144 is affirmative, then control proceeds to step 146. A human operator is prompted to classify the symbol. Typically, this is accomplished by a manual key-in of the correct classification. However, any known user interface and input technique may be employed in step 146, e.g., graphical interfaces, and voice-to-text applications.

If the determination at decision step 144 is negative, or after performing step 146, control proceeds to step 148. With operator assistance, the current symbol is assigned to a category, e.g., trademark logo, typographic symbol, mathematical symbol.

Control now proceeds to decision step 150, where it is determined if more symbols remain to be evaluated. If the determination at decision step 150 is affirmative, then control returns to decision step 144.

If the determination at decision step 150 is negative, then control proceeds to final step 152. The unknown fonts have now been classified, and the respective portions of the document can be subjected to OCR training and optimization in accordance with the method for treating known fonts described above with reference to FIG. 8.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method of image-to-text processing, comprising the steps of:
    acquiring an image of a document having words written thereon;
    segmenting said image into areas, each area containing one of said words;
    using said areas, defining a dictionary containing reference images of said words, which comprise respective sequences of characters in respective fonts, along with respective codes corresponding to said words;
    comparing said areas to said reference images and classifying said words in said document that match said reference images as identified words and classifying said words that do not match any of said reference images as unidentified words;
    generating respective new codes for one or more of said unidentified words, and adding said one or more of said unidentified words and said respective new codes to said dictionary for use in comparing other said areas of said document; and
    outputting a coded version of said document.

2. The method according to claim 1, wherein said words are written in system-recognized fonts and in system-unrecognized fonts, further comprising the steps of:
    defining in said image first font areas, wherein said words thereof are written in one of said system-recognized fonts, and second font areas wherein said words thereof are written in one of said system-unrecognized fonts;
    associating recognition engines and verification dictionaries with said first font areas, respectively, wherein said verification dictionaries are likely to contain said words in respective ones of said first font areas;

executing said recognition engines using said verification dictionaries, respectively, to obtain recognition results, said recognition engines being operative to categorize said words of said first font areas, into a category selected from the group of valid words and invalid words;

authenticating at least a portion of said invalid words, respectively to define authenticated invalid words;

modifying said verification dictionaries to include at least a portion of said authenticated invalid words to establish revised verification dictionaries;

thereafter repeating said steps of executing, authenticating and modifying using said revised verification dictionaries as said verification dictionaries to obtain updated recognition results until a predefined quality level has been achieved; and reporting said updated recognition results.

3. The method according to claim 2, further comprising the steps of:

defining in said image language-specific areas, wherein said words thereof are written in a single language; and selecting at least a portion of said verification dictionaries from language-specific dictionaries having words of said single language therein.

4. The method according to claim 2, further comprising the steps of:

defining in said image domain-specific areas, wherein said words thereof are likely to be specific to a single domain; and selecting at least a portion of said verification dictionaries from domain-specific dictionaries having words of said single domain therein.

5. The method according to claim 2, wherein said words comprise icons, further comprising the steps of:

arranging said icons in said second font areas in clusters according to shape;

classifying said icons in said clusters with human assistance; and updating said recognition engines responsively to said step of classifying said icons.

6. The method according to claim 2, wherein said recognition engines are operative to recognize said characters individually, further comprising the steps of:

categorizing said characters of said first font areas into a category selected from the group of valid characters and invalid characters; and adding at least a portion of said valid characters to a set of characters used by said recognition engines.

7. The method according to claim 1, wherein at least a portion of said document is written in a first language, and wherein outputting a coded version comprises displaying said words in a second language that differs from said first language.

8. The method according to claim 1, wherein at least a portion of said document is written in a first alphabet, and wherein outputting a coded version comprises displaying said words in a second alphabet that differs from said first alphabet.

9. A computer software product for image-to-text processing, including a non-transitory computer storage medium in which computer program instructions are stored, which instructions, when executed by a computer, cause the computer to acquire an image of a document having words written thereon, segment said image into areas, each area containing one of said words, using said areas, define a dictionary containing reference images of said words, which comprise respective sequences of characters in respective fonts, along with respective codes corresponding to said words, compare said areas to said reference images and classifying said words in said document that match said reference images as identified words and classifying said words that do not match any of said reference images as unidentified words, generate respective new codes for one or more of said unidentified words, and adding said one or more of said unidentified words and said respective new codes to said dictionary for use in comparing other said areas of said document, and output a coded version of said document.

10. The computer software product according to claim 9, wherein said words are written in system-recognized fonts and in system-unrecognized fonts, wherein said instructions further cause said computer to define in said image first font areas, wherein said words thereof are written in one of said system-recognized fonts, and second font areas wherein said words thereof are written in one of said system-unrecognized fonts, associate recognition engines and verification dictionaries with said first font areas, respectively, wherein said verification dictionaries are likely to contain said words in respective ones of said first font areas, and iteratively execute said recognition engines using said verification dictionaries, respectively, to obtain recognition results, said recognition engines being operative to categorize said words of said first font areas, into a category selected from the group of valid words and invalid words, authenticate at least a portion of said invalid words, respectively to define authenticated invalid words, modify said verification dictionaries to include at least a portion of said authenticated invalid words to establish revised verification dictionaries until a predefined quality level has been achieved, and report said recognition results.

11. The computer software product according to claim 10, wherein said instructions further cause said computer to define in said image language-specific areas, wherein said words thereof are written in a single language, and select at least a portion of said verification dictionaries from language-specific dictionaries having words of said single language therein.

12. The computer software product according to claim 10, wherein said instructions further cause said computer to define in said image domain-specific areas, wherein said words thereof are likely to be specific to a single domain, and select at least a portion of said verification dictionaries from domain-specific dictionaries having words of said single domain therein.

13. The computer software product according to claim 10, wherein said words comprise icons, wherein said instructions further cause said computer to arrange said icons in said second font areas in clusters according to shape, classify said icons in said clusters with human assistance, and update said recognition engines responsively to a classification of said icons.

14. The computer software product according to claim 10, wherein said recognition engines are operative to recognize said characters individually, wherein said instructions further cause said computer to categorize said characters of said first font areas into a category selected from the group of valid characters and invalid characters; and add at least a portion of said valid characters to a set of characters used by said recognition engines.

15. A data processing system for image-to-text processing, comprising:

a processor connectable to an optical scanner; and a memory accessible by said processor storing programs and data objects therein, said processor cooperative with said optical scanner to acquire an image of a document having words written thereon, segment said image into areas, each area containing one of said words, and using said areas, to define a dictionary containing reference images of said words, which comprise respective sequences of characters in respective fonts, along with respective codes corresponding to said words, compare said areas to said reference images and classifying said words in said document that match said reference images as identified words and classifying said words that do not match any of said reference images as unidentified words, generate respective new codes for one or more of said unidentified words, and adding said one or more of said unidentified words and said respective new codes to said dictionary for use in comparing other said areas of said document, and to output a coded version of said document.

16. The data processing system according to claim 15, wherein said programs and said data objects comprise recognition engines and verification dictionaries, and wherein said words are written in system-recognized fonts and in system-unrecognized fonts, wherein said instructions further cause said computer to define in said image first font areas, wherein said words thereof are written in one of said system-recognized fonts, and second font areas wherein said words thereof are written in one of said system-unrecognized fonts, associate said recognition engines and said verification dictionaries with said first font areas, respectively, wherein said verification dictionaries are likely to contain said words in respective ones of said first font areas, and iteratively execute said recognition engines using said verification dictionaries, respectively, to obtain recognition results, said recognition engines being operative to categorize said words of said first font areas, into a category selected from the group of valid words and invalid words, authenticate at least a portion of said invalid words, respectively to define authenticated invalid words, modify said verification dictionaries to include at least a portion of said authenticated invalid words to establish revised verification dictionaries until a predefined quality level has been achieved, and report said recognition results.

17. The data processing system according to claim 16, wherein said processor is operative to define in said image language-specific areas, wherein said words thereof are written in a single language, and select at least a portion of said verification dictionaries from language-specific dictionaries having words of said single language therein.

18. The data processing system according to claim 16, wherein said processor is operative to define in said image domain-specific areas, wherein said words thereof are likely to be specific to a single domain, and select at least a portion of said verification dictionaries from domain-specific dictionaries having words of said single domain therein.

19. The data processing system according to claim 16, wherein said words comprise icons, wherein said processor is operative to arrange said icons in said second font areas in clusters according to shape, classify said icons in said clusters with human assistance, and update said recognition engines responsively to a classification of said icons.

20. The data processing system according to claim 16, wherein said recognition engines are operative to recognize said characters individually, wherein said processor is operative to categorize said characters of said first font areas into a category selected from the group of valid characters and invalid characters; and add at least a portion of said valid characters to a set of characters used by said recognition engines.

* * * * *